United States Patent
Melnik et al.

(10) Patent No.: US 7,546,957 B2
(45) Date of Patent: Jun. 16, 2009

(54) TRAVEL KIOSK

(75) Inventors: Daniel Melnik, Melbourne, FL (US); Rafael Yepez, Sanford, FL (US); Jason Mastry, Sanford, FL (US)

(73) Assignee: NCR Corporation, Dayton, OH (US)

( * ) Notice: Subject to any disclaimer, the term of this patent is extended or adjusted under 35 U.S.C. 154(b) by 216 days.

(21) Appl. No.: 11/754,604

(22) Filed: May 29, 2007

(65) Prior Publication Data

US 2008/0296394 A1 Dec. 4, 2008

(51) Int. Cl.
*G06K 13/00* (2006.01)
*G06K 5/00* (2006.01)
*H04K 1/00* (2006.01)

(52) U.S. Cl. ............... 235/485; 235/380; 705/50

(58) Field of Classification Search ............ 235/485
See application file for complete search history.

(56) References Cited

U.S. PATENT DOCUMENTS

2004/0078335 A1* 4/2004 Calvesio et al. ............. 705/50
2006/0065714 A1* 3/2006 Jesme .................... 235/380
2008/0018451 A1* 1/2008 Slibeck et al. ............. 340/521

FOREIGN PATENT DOCUMENTS

WO WO2006/060090 * 7/2006

OTHER PUBLICATIONS

IER, IER 918 Self Service Check-In Kiosks, Sep. 2006.*
IER, IER 918 Self Service Check-In Kiosks.

* cited by examiner

*Primary Examiner*—Tung S Lau
*Assistant Examiner*—Laura Gudorf
(74) *Attorney, Agent, or Firm*—Paul W. Martin

(57) ABSTRACT

A travel kiosk which focuses operator attention to a work area. The travel kiosk includes a first portion containing a touch screen, and a second portion adjacent the first portion including a work area. The work area includes a printer, a barcode reader, a passport imager, and a radio frequency reader. The work area further includes a shelf for aligning a passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader.

26 Claims, 6 Drawing Sheets

TRAVEL KIOSK

BACKGROUND

Travel kiosks typically consist of stand alone peripherals to a primary self service device. These peripherals may be included within the overall millwork or enclosure of the travel kiosk so as to appear to be integrated but have separate work areas to deliver travel documents and read barcodes on travel documents, read passports, and read contactless cards.

It would be desirable to provide a travel kiosk that is more ergonomic to an operator.

SUMMARY

A travel kiosk is provided.

The travel kiosk includes a first portion containing a touch screen, and a second portion adjacent the first portion including a printer, a barcode reader, a passport imager, and a radio frequency reader. The second portion contains a work area for obtaining first information from an operator provided passport, for obtaining second information from an operator provided travel document, and for delivering a printed travel document to the customer. The work area includes a shelf for aligning the passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader, wherein the barcode reader scans the operator provided travel document following placement under the overhang.

DETAILED DESCRIPTION

Figure 1:
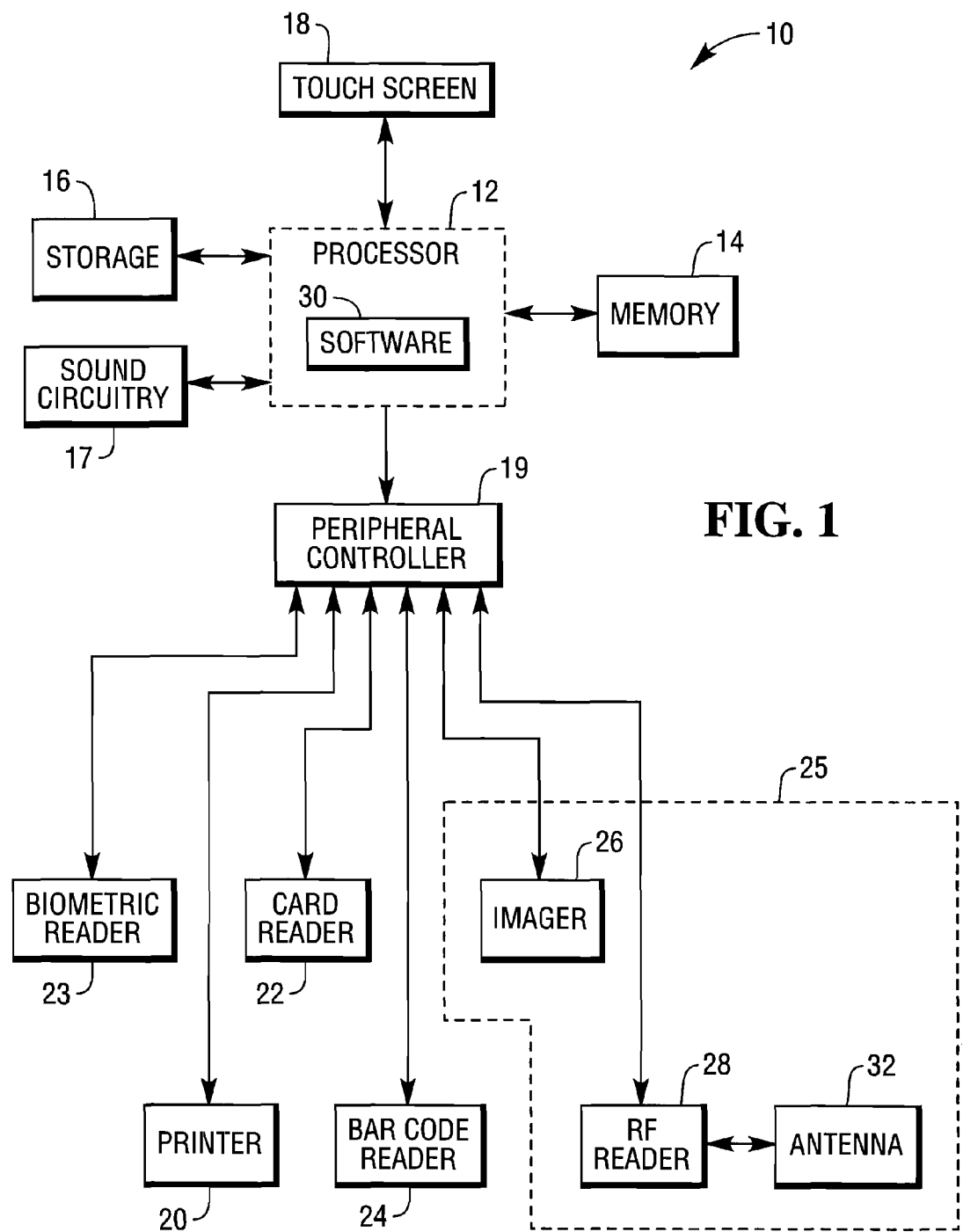
FIG. 1 is a block diagram of an example travel kiosk.

With reference to FIG. 1, travel kiosk 10 includes processor 12, memory 14, storage 16, and touch screen 18.

Processor 12 executes software 30 for displaying instructions, issuing prompts, and receiving inputs from users through touch screen 18. Processor 12 loads software 30 from storage 16 into memory 14 during execution.

Software 30 also controls a number of peripheral modules through one or more peripheral controllers 19. Peripheral controller 19 may include a serial controller, such as an RS232 or USB controller.

Kiosk 10 may additionally include sound circuitry 17 for providing aural feedback to an operator during use of kiosk 10 and its peripherals. Sound circuitry 17 may include a tone generator and speakers.

Peripherals include printer 20, magnetic card reader 22, biometric reader 23, barcode reader 24, and passport reader 25.

Printer 20 prints travel documents, including tickets, boarding passes, receipts, and agendas under the control of software 30.

Magnetic card reader 22 reads magnetic cards, such as payment cards and loyalty cards, under the control of software 30. Magnetic card reader 22 may include any of the know types of magnetic card readers, including a manual drag-through slot card reader, a motorized card reader, or a push-pull card reader.

Biometric reader 23 reads a biometric characteristic of an operator to identify the operator. Biometric reader 23 may include a fingerprint sensor.

Barcode reader 24 reads barcode labels travel documents under the control of software 30.

Passport reader 25 includes primarily includes imager 26 and RF reader 28.

Imager 26 captures an image of a machine readable zone on passports under the control of software 30. Software 30 obtains information from the image via optical character recognition.

RF reader 28 interrogates and reads data from RF chips in passports through antenna 32 and under the control of software 30. RE reader 28 may also be used to read contactless payment cards.

Figure 2:
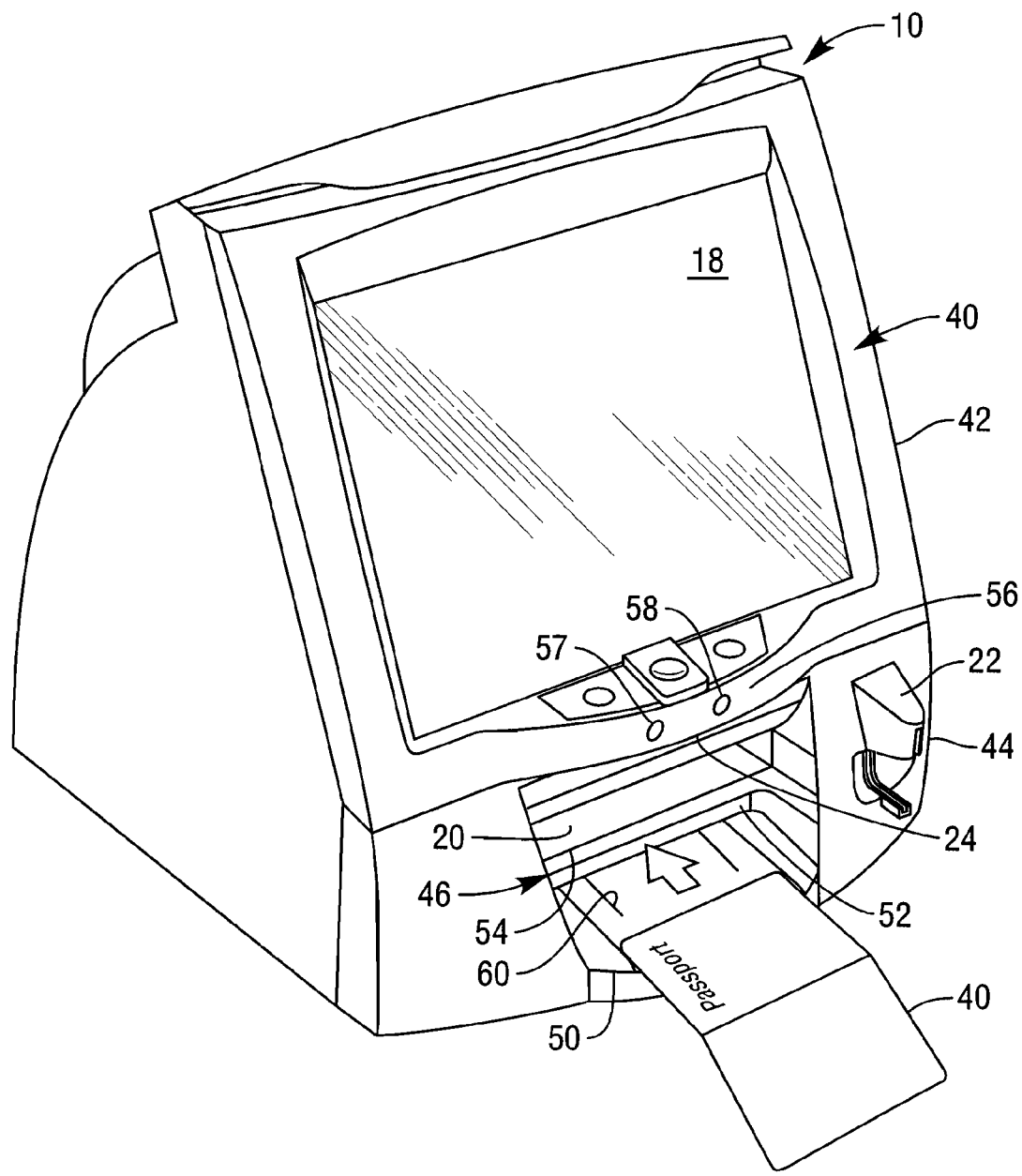
FIG. 2 is a perspective view of the example travel kiosk illustrating insertion of a passport.

Turning now to FIG. 2, example travel kiosk 10 is illustrated in further detail.

Travel kiosk 10 includes a front surface 40 that provides a point of focus for user interaction. Front surface 40 includes top portion 42 and bottom portion 44.

Top portion 42 includes touch screen 18. Touch screen 18 provides a point of focus for users during display of instructions and receipt of touch entered data from users.

Top portion 42 may also include a manual drag-through slot card reader 22a above touch screen 18.

Bottom portion 44 includes card reader 22b, biometric reader 23, barcode reader 24, and passport reader 25.

Components in bottom portion 44 and organized into a work area 46 that provides a point of focus for users during printing of travel documents, reading of contactless cards and passports, scanning of barcodes on travel documents, and reading of biometric data. With the option of adding card reader 22a, the operator's focus may be extended vertically to accommodate reading magnetic cards.

Work area 46 includes shelf 50, passport tunnel 52, printer exit shoot 54, and overhang 56.

Shelf 50 includes guide edges 60 for aligning passport 40 with passport tunnel 52. Passport 40 is illustrated in a position aligned within guide edges 60.

Passport tunnel 52 retains passport 40 with travel kiosk 10 for capturing of information from machine readable zone by imager 26 and from an REF chip in passport 40 by RF reader 28.

Printer exit shoot 54 provides a location in work area 46 for depositing travel documents for user pickup.

Overhang 56 contains biometric reader 23 on top and barcode reader 24 underneath. Barcode reader 24 is aimed in a generally downward direction in order to read barcode labels oriented upwards on travel documents placed in work area 46.

Overhang 56 may also include light emitting diodes (LEDs) 57 and 58 which indicate whether a passport is correctly or incorrectly positioned. LEDs 57 and 58 may be different colors, such as green and red.

Scanner 10 is coupled to point-of-sale (POS) terminal 62. A display 64 may also be coupled to POS terminal 62.

Bottom portion 44 may also include a push-pull type card reader 22b instead of slot-type card reader 22a.

Figure 3:
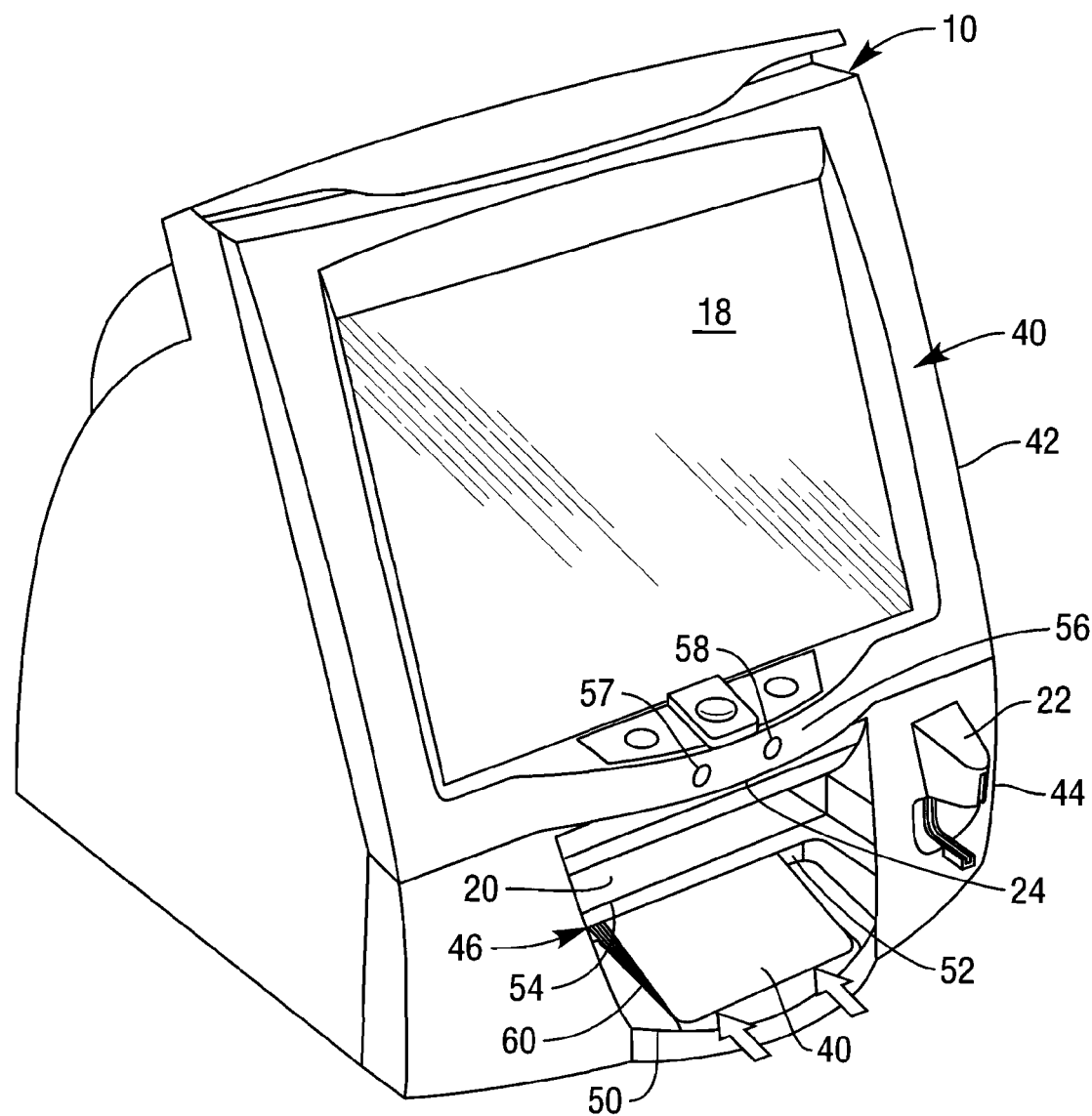
FIG. 3 is a second perspective view of the example travel kiosk illustrating insertion of a passport.

With reference to FIG. 3, passport 40 is illustrated in a data capture position within passport tunnel 52. An operator properly positions passport 40 within passport tunnel 52 in response to prompts issued by software 30. About half of the cover of passport 40 is inserted into passport tunnel 52.

Figure 4:
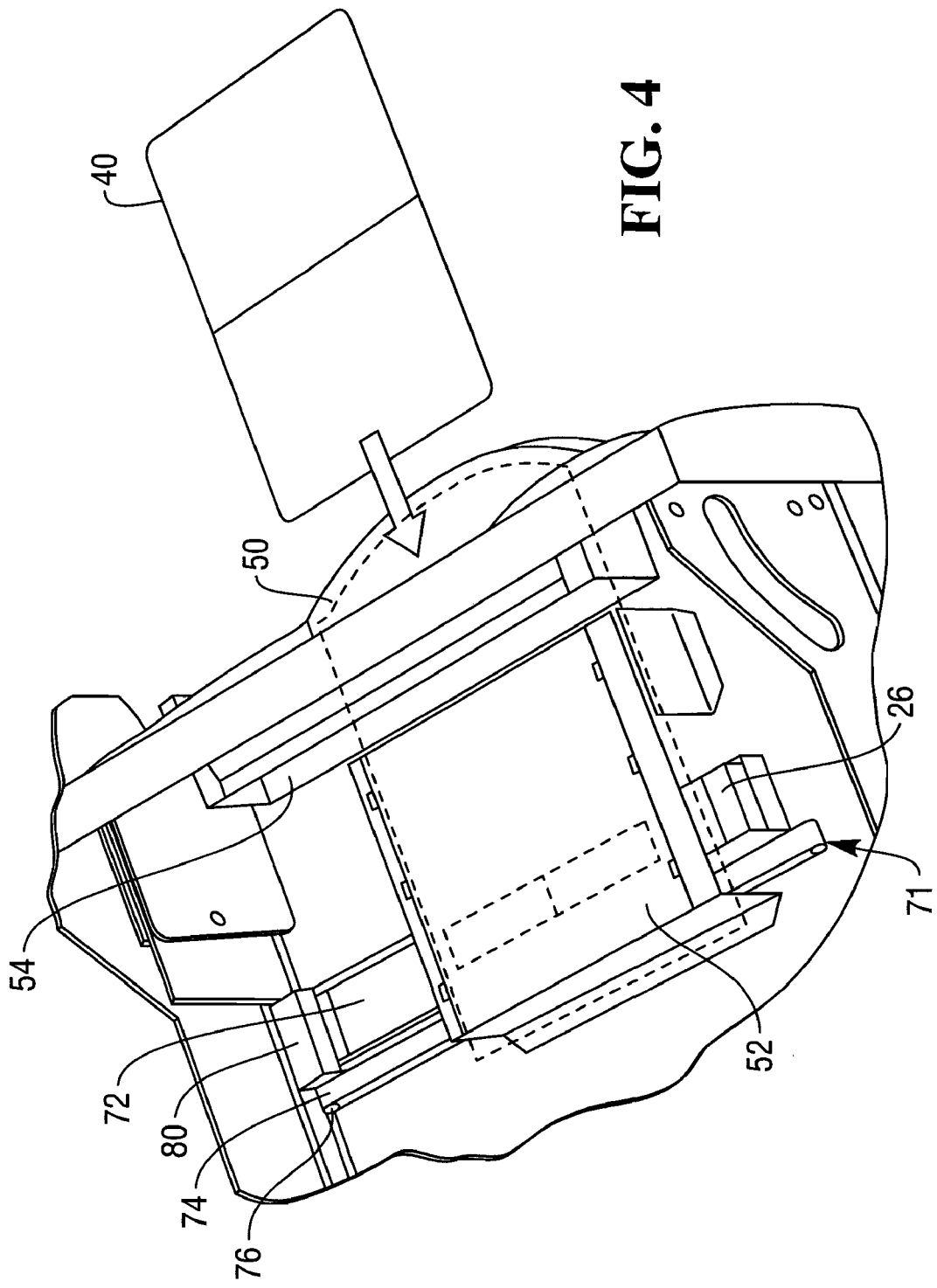
FIG. 4 is a diagram illustrating passport reading components.

Software 30 activates LED 57 to indicate that passport 40 is correctly positioned, or LED 58 to indicate that passport 40 is incorrectly positioned, in response to signals from sensors 82 and 84 (FIG. 4).

After passport 40 is correctly positioned. Software 30 activates imager 26 to capture an image of the machine readable zone and activates RF reader 28 to capture information from the RF chip, assuming one is present, in passport 40. If capture was successful, software 30 may activate sound circuitry 17 to provide an indication of positive capture. If capture was unsuccessful, software 30 may activate sound circuitry 17 to provide a corresponding indication.

With reference to FIG. 4, passport reader 25 is illustrated in more detail.

In addition to image reader 26, RF reader 28, and antenna 32, passport reader 25 includes imager transport 71, and position sensors 82 and 84.

Imager transport 71 includes track 72, belt 74, wheels 76 and 78, and motor 80.

Imager 26 is mounted within track 72. Track 72 is located in a position for capturing an image of the machine readable zone of passport 40.

Imager 26 is coupled to belt 74. Belt 74 is mounted around wheels 76 and 78. Wheel 76 is driven by motor 80. Imager 26 moves within track 72 to capture an image of the machine readable zone of passport 40 under the control of software 30.

Passport tunnel 52 extends into travel kiosk 10 from work area 46. Passport tunnel 52 may be made of clear plastic to facilitate capturing of images by imager 26.

Sensors 82 and 84 are mounted to passport tunnel 52. Sensors 82 and 84 send signals to processor 12 to indicate that passport. 40 is in a correct position for imaging. Software 30 activates LEDs 57 or 58 to indicate a correct or incorrect position.

Antenna 32 may include a loop of wire extending under shelf 50 and passport tunnel 52.

Software 30 prompts an operator to insert passport 40. Software 30 may display instructions and illustrations showing a correct orientation. Software 30 may display an instruction to hold passport 40 still until reading is finished.

Software 30 may provide feedback in response to signals from position sensors 82 and 84. For example, software 30 may activate LED 57 to indicate correct alignment, and activate LED 58 and sound circuitry 17 (e.g., beep three times) to indicate incorrect alignment. Software 30 may additionally display instructions to realign or reinsert passport 40.

If position sensors 82 and 84 provide signals indicating that passport 40 is properly aligned, software 30 activates imager transport 71. Imager 26 moves across the machine readable zone and reads information therein. If software 30 determines that no information was read, software 30 activates imager transport 71 to move imager 26 a second time. If no information is read a third time, software 30 displays instructions to reinsert passport 40 or seek help. Software 30 may additionally activate LED 58 and sound circuitry 17 (e.g., beep three times) to indicate reading has failed.

Following reading of information in the machine readable zone, software 30 activates RF reader 28 to detect and read an RF data chip, if one is present in passport 40. If an RF chip is present, RF reader sends a key to unlock the RF chip and downloads the data in the RF chip. Software 30 displays instructions to remove passport 40. Software 30 may also activate LED 57 and sound circuitry 17 (e.g., beep one time) to prompt an operator to remove passport 40.

Figure 5:
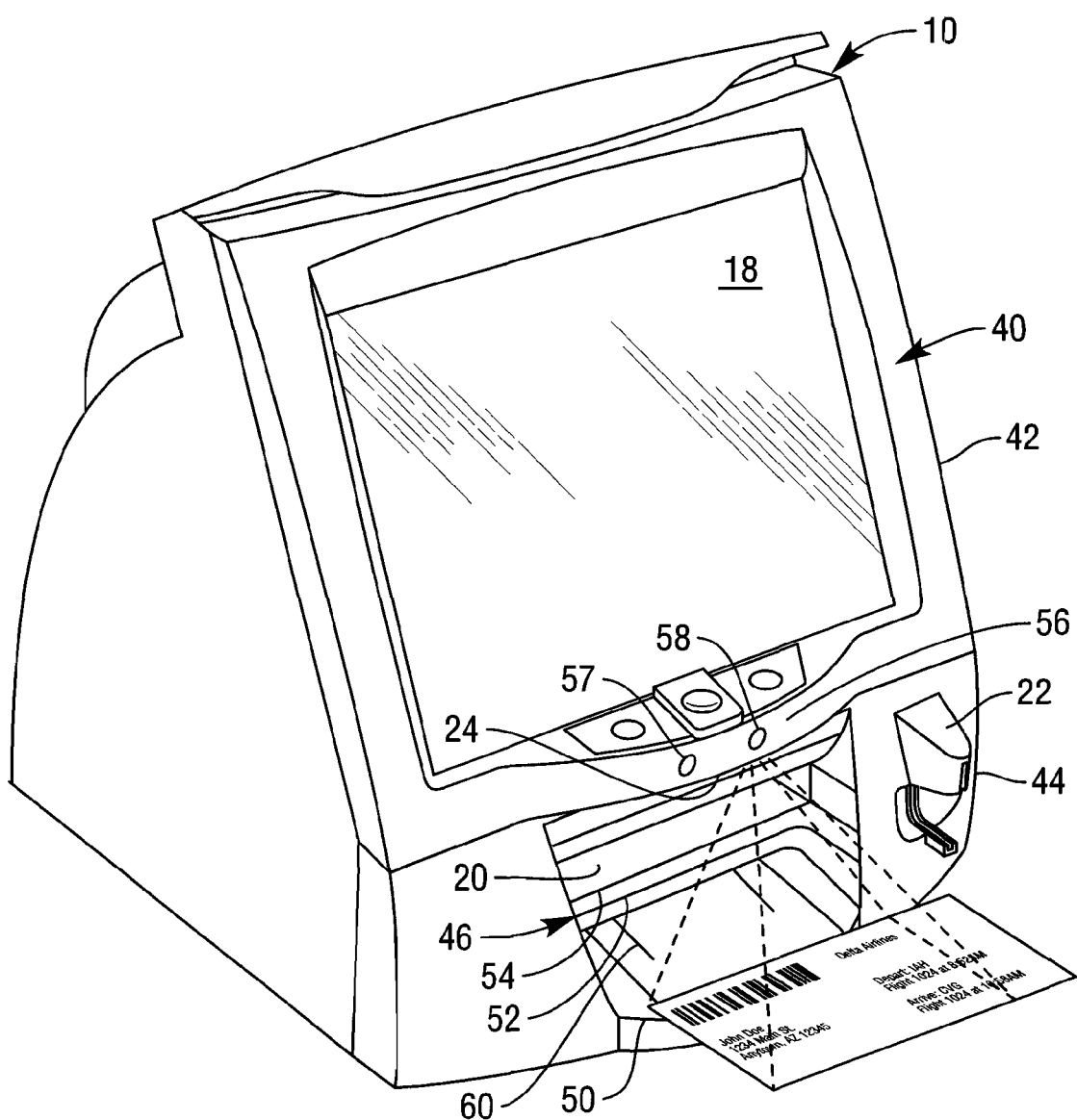
FIG. 5 is a third perspective view of the example travel kiosk illustrating reading of a barcode label on a boarding pass.

With reference to FIG. 5, a barcode label 92 on a travel document 90 in work area 46 is being read by barcode reader 24. The field of view 94 of barcode reader 24 is within work area 46 and may extend beyond work area 46.

Software 30 displays prompts and instructions and may also illustrate a proper orientation of travel document 90. Thereafter, an operator properly orients travel document 90 within work area 46.

Software 30 activates barcode reader 24 to read barcode label 92. Software 30 may also activate sound circuitry 17 and LED 57 or LED 58 to provide an indication of a successful or unsuccessful reading of barcode label 92.

Figure 6:
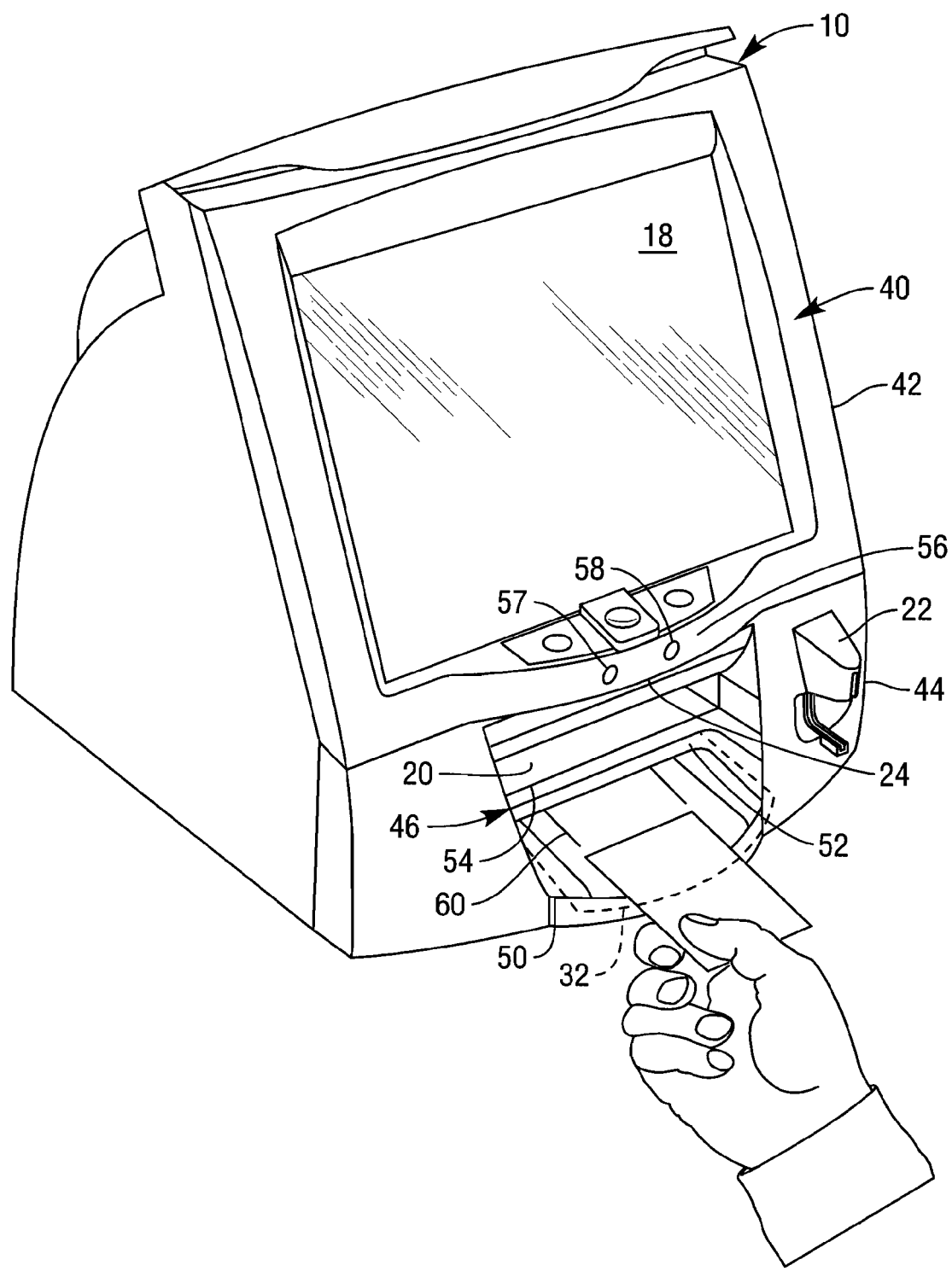
FIG. 6 is a fourth perspective view of the example travel kiosk illustrating reading information from a contactless card.

With reference to FIG. 6, a contactless card 100 in work area 46 is being read by RF reader 28. The range of RF reader 28 extends to cover work area 46 and may also extend beyond work area 46.

Software 30 displays prompts and instructions and may also illustrate proper location of contactless card 100 within work area 46. An operator properly orients contactless card 100 within work area 46.

Software 30 activates RF reader 28 to read contactless card 100. Software 30 may also activate sound circuitry 17 and LED 57 or LED 58 to provide an indication of a successful or unsuccessful reading of contactless card 100.

Although particular reference has been made to certain embodiments, variations and modifications are also envisioned within the spirit and scope of the following claims.

What is claimed is:

1. A travel kiosk comprising:
a first portion containing a touch screen; and
a second portion adjacent the first portion including
   a printer
   a barcode reader;
   a passport imager; and
   a radio frequency reader; and
wherein the second portion contains a work area for obtaining first information from an operator provided passport, for obtaining second information from an operator provided travel document, and for delivering a printed travel document to the operator;
wherein the work area includes
   a shelf for aligning the passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader, wherein the barcode reader scans the operator provided travel document following placement under the overhang; and
wherein the kiosk further includes visual indicators for indicating successful and unsuccessful obtaining of the first and second information.

2. The kiosk of claim 1, wherein the first portion further includes a magnetic stripe reader above the touch screen.

3. The kiosk of claim 1, wherein the work area is also for obtaining biometric data from an operator, and wherein the second portion further includes a biometric sensor on top of the overhang for capturing the biometric data.

4. The kiosk of claim 3, wherein the biometric sensor comprises a fingerprint sensor.

5. The kiosk of claim 1, further comprising an antenna coupled to the radio frequency reader and located within the shelf.

6. The kiosk of claim 1, wherein the radio frequency reader reads data from a radio frequency chip in the passport.

7. The kiosk of claim 1, wherein the work area is also for obtaining data from contactless cards, and wherein the radio frequency reader reads the data when the contactless card is in the work area.

8. The kiosk of claim 1, wherein the second portion further comprises an imager transport for positioning the passport imager to read the first information from the passport.

9. The kiosk of claim 8, wherein the imager transport comprises:
   a track for guiding the passport imager;
   a first wheel at one end of the track;
   a second wheel at another end of the track;
   a belt around the first and second wheels and coupled to the imager; and
   a motor for rotating the first wheel.

10. The kiosk of claim 1, further comprising:
    a position sensor for providing signals indicating that the passport is properly aligned and located in the position for reading by the passport imager.

11. The kiosk of claim 10, further comprising:
    visual indicators for indicating successful and unsuccessful alignment of the passport.

12. The kiosk of claim 11, wherein the visual indicators comprise different colored light emitting diodes.

13. The kiosk of claim 1, further comprising:
    sound circuitry for indicating successful and unsuccessful obtaining of the first and second information.

14. The kiosk of claim 13, wherein the sound circuitry comprises:
    a speaker; and
    a tone generator coupled to the speaker.

15. A method of completing a travel transaction comprising:
    prompting an operator to place a passport in a work area of a travel kiosk, wherein the work area includes a shelf, a tunnel at an end of the shelf, a printer exit shoot above the tunnel for delivering a printed travel document from a printer, and an overhang above the printer exit shoot containing a barcode reader;
    prompting the operator to position the passport on the shelf and insert the passport into the tunnel for reading by an imager in the kiosk; and
    processing the passport by the travel kiosk.

16. The method of claim 15, further comprising:
    displaying instructions and illustrations showing correct positioning and insertion.

17. The method of claim 15, further comprising:
    sensing a position of the passport; and
    providing feedback to the operator indicating if alignment is correct or incorrect.

18. The method of claim 17, further comprising:
    activating the imager if the alignment is correct.

19. The method of claim 18, further comprising:
    activating a radio frequency reader to read a radio frequency data chip in the passport while the passport is in the tunnel.

20. A travel kiosk comprising:
    a first portion containing a touch screen; and
    a second portion adjacent the first portion including
       a printer
       a barcode reader;
       a passport imager; and
       a radio frequency reader; and
    wherein the second portion contains a work area for obtaining first information from an operator provided passport, for obtaining second information from an operator provided travel document, and for delivering a printed travel document to the operator;
    wherein the work area includes
       a shelf for aligning the passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader, wherein the barcode reader scans the operator provided travel document following placement under the overhang; and
    wherein the kiosk further includes sound circuitry for indicating successful and unsuccessful obtaining of the first and second information.

21. The kiosk of claim 20, wherein the sound circuitry comprises:
    a speaker; and
    a tone generator coupled to the speaker.

22. A travel kiosk comprising:
    a first portion containing a touch screen; and
    a second portion adjacent the first portion including
       a printer
       a barcode reader;
       a passport imager; and
       a radio frequency reader; and
    wherein the second portion contains a work area for obtaining first information from an operator provided passport, for obtaining second information from an operator provided travel document, and for delivering a printed travel document to the operator;
    wherein the work area includes
       a shelf for aligning the passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader, wherein the barcode reader scans the operator provided travel document following placement under the overhang; and
    wherein the kiosk further includes a position sensor for providing signals indicating that the passport is properly aligned arid located in the position for reading by the passport imager, and visual indicators for indicating successful and unsuccessful alignment of the passport.

23. A travel kiosk comprising:
    a first portion containing a touch screen; and
    a second portion adjacent the first portion including
       a printer
       a barcode reader;
       a passport imager; and
       a radio frequency reader; and
    wherein the second portion contains a work area for obtaining first information from an operator provided passport, for obtaining second information from an operator provided travel document, and for delivering a printed travel document to the operator;
    wherein the work area includes
       a shelf for aligning the passport, a passport tunnel at an end of the shelf for guiding the passport into a position in the second portion for reading by the passport imager and the radio frequency reader, a printer exit shoot above the passport tunnel for delivering a printed travel document from the printer, and an overhang above the printer exit shoot containing the barcode reader, wherein the barcode reader scans the operator provided travel document following placement under the overhang; and wherein the second portion further comprises an imager transport for positioning the passport imager to read the first information from the passport including a track for guiding the passport imager;

a first wheel at one end of the track;

a second wheel at another end of the track;

a belt around the first and second wheels and coupled to the imager; and a motor for rotating the first wheel.

24. A method of completing a travel transaction comprising:

prompting an operator to place an operator-provided travel document containing a barcode label in a work area of a travel kiosk, wherein the work area includes a shelf, a tunnel at an end of the shelf, a printer exit shoot above the tunnel for delivering a printed travel document from a printer, and an overhang above the printer exit shoot containing a barcode reader;

prompting the operator to scan the barcode label on the operator-provided travel document by the travel kiosk; and processing the operator-provided travel document by the travel kiosk.

25. The method of claim 24, further comprising:

displaying instructions and illustrations showing proper orientation of the operator-provided travel document within the. work area.

26. A method of completing a travel transaction comprising:

prompting an operator to place a contactless card in a work area of a travel kiosk, wherein the work area includes a shelf, a tunnel at an end of the shelf, a printer exit shoot above the tunnel for delivering a printed travel document from a printer, and an overhang above the printer exit shoot containing a barcode reader;

displaying instructions and illustrations showing proper orientation of the contactless card within the work area for reading by a radio frequency reader; and processing the contactless card by the travel kiosk.

* * * * *